US012554488B2

(12) United States Patent
Barbulescu et al.

(10) Patent No.: US 12,554,488 B2
(45) Date of Patent: Feb. 17, 2026

(54) AUTOMATIC GENERATION OF A COEXISTENCE LAYER USING ROBOTIC PROCESS AUTOMATION FOR APPLICATION MODERNIZATION

(71) Applicant: INTERNATIONAL BUSINESS MACHINES CORPORATION, Armonk, NY (US)

(72) Inventors: Corneliu Nicolae Barbulescu, Otopeni (RO); Ciprian Constantinescu, Bucharest (RO)

(73) Assignee: International Business Machines Corporation, Armonk, NY (US)

( * ) Notice: Subject to any disclaimer, the term of this patent is extended or adjusted under 35 U.S.C. 154(b) by 193 days.

(21) Appl. No.: 18/503,159

(22) Filed: Nov. 6, 2023

(65) Prior Publication Data
US 2025/0147759 A1 May 8, 2025

(51) Int. Cl.
*G06F 9/44* (2018.01)
*G06F 8/36* (2018.01)
*G06F 8/76* (2018.01)

(52) U.S. Cl.
CPC . *G06F 8/76* (2013.01); *G06F 8/36* (2013.01)

(58) Field of Classification Search
CPC ..................................... G06F 8/76; G06F 8/36
See application file for complete search history.

(56) References Cited

U.S. PATENT DOCUMENTS

| 10,031,745 | B2 | 7/2018 | Chen | |
| 10,749,990 | B1* | 8/2020 | Gardiner | H04L 67/02 |
| 11,567,760 | B2 | 1/2023 | Harishankar | |
| 2016/0217058 | A1* | 7/2016 | Kidron | G06F 11/3698 |
| 2020/0042314 | A1* | 2/2020 | Reese | G06F 8/71 |
| 2020/0241916 | A1* | 7/2020 | Bachelor | G06F 9/4843 |
| 2022/0121645 | A1* | 4/2022 | Chermside | G06F 9/547 |

OTHER PUBLICATIONS

Bastani, K., "Building Spring Cloud Microservices That Strangle Legacy Systems", downloaded from https://www.kennybastani.com/2016/08/strangling-legacy-microservices-spring-cloud.html (2016), 51 pgs.

(Continued)

*Primary Examiner* — Qamrun Nahar
(74) *Attorney, Agent, or Firm* — CHIP LAW GROUP

(57) ABSTRACT

Updating calls or operations in a database management system includes mapping, by a computer processor, application programming interface (API) types associated with a legacy server and a new server. The legacy server recognizes request signatures of a first API type and the new server recognizes request signatures of a second API type that is distinct from the first API type. A request is received from a system of engagement, addressed to a system of records resident on a legacy server. The request is intercepted by a coexistence layer module. A determination is made of whether the intercepted request uses a request signature recognized by the first API type. The coexistence layer module converts the intercepted request to a format using the request signature of the second API type. The converted intercepted request is sent to the new server. The converted intercepted request is performed by the new server.

20 Claims, 6 Drawing Sheets

(56) References Cited

OTHER PUBLICATIONS

Kadambi, B., "Digital Decoupling Layer for Cloud Modernization using Cloud Pak for Data", downloaded from https://github.com/IBM/app-modernization-coexistence-layer downloaded Aug. 1, 2023, 27 pgs.

Unknown, "Robotic Process Automation (RPA) Adds a Shiny Microservice Surface but Technical Debt Lurks Beneath", downloaded from, https://sync-sys.com/robotic-process-automation-rpa-adds-a-shiny-microservicesurface-but-technical-debt-lurks-beneath (2023), 14 pgs.

Unknown, Chapter 9, Azure Service Bus—Red Had Customer Portal, https://access.redhat.com/documentation/en-us/red_hat_build_of_apache_camel_for_spring_boot/3.20/html/camel_spring_boot_reference/csb-camel-azure-servicebus-component-starter (2023), 11 pgs.

\* cited by examiner

AUTOMATIC GENERATION OF A COEXISTENCE LAYER USING ROBOTIC PROCESS AUTOMATION FOR APPLICATION MODERNIZATION

BACKGROUND

Technical Field

The present disclosure generally relates to database management systems, and more particularly, to an automatic generation of a coexistence layer using robotic process automation for application modernization.

Description of the Related Art

A system of record (SOR) is typically a centralized data management system designed to store and manage operational data for long-term use. Generally speaking, a system of record is used as a "master source" of data that can be used to inform other system operations and decision-making. A system of records also includes business logic for processing operational data. A system of record may generally hold data that will not change often.

A system of engagement (SOE) is typically a decentralized system built to facilitate the creation and consumption of real-time data. Compared to the system of record, the system of engagement is more about short-term operations and quick decision-making. A system of engagement also includes processing for presentation and consumption purposes A system of engagement may generally be used in a real-time environment where data must be acted on or consumed quickly.

In a conventional arrangement, the SoR is located on provider side servers. The SoE is located on client-side servers. The data stored in an SoR can be very large compared to the data consumed for the short-term operations of the SoE. In information storage systems, a client may sometimes request to break down monolithic system of records applications into componentized architectures that are moved to a new platform.

SUMMARY

According to an embodiment of the present disclosure, a computer program product for updating calls or operations in a database management system includes one or more computer readable storage media, and program instructions collectively stored on the one or more computer readable storage media. The program instructions include mapping, by a computer processor, application programming interface (API) types associated with a legacy server and a new server. The legacy server recognizes request signatures of a first API type and the new server recognizes request signatures of a second API type that is distinct from the first API type. The computer processor receives a request from a system of engagement resident on a client-side computing device, addressed to a system of records resident on a legacy server. The request includes a call or operation. The request is intercepted by a coexistence layer module run by the computer processor. The computer processor, referencing the mapping, determines whether the intercepted request points to a system of records component that has been moved from the legacy server to a new server. A determination is made of whether the intercepted request uses a request signature recognized by the first API type. The coexistence layer module converts the intercepted request to a format using the request signature of the second API type. The converted intercepted request is sent to the new server. The converted intercepted request is performed by the new server.

According to an embodiment of the present disclosure, a method for updating calls or operations in a database management system includes mapping, by a computer processor, application programming interface (API) types associated with a legacy server and a new server. The legacy server recognizes request signatures of a first API type and the new server recognizes request signatures of a second API type that is distinct from the first API type. The computer processor receives a request from a system of engagement resident on a client-side computing device, addressed to a system of records resident on a legacy server. The request includes a call or operation. The request is intercepted by a coexistence layer module run by the computer processor. The computer processor, referencing the mapping, determines whether the intercepted request points to a system of records component that has been moved from the legacy server to a new server. A determination is made of whether the intercepted request uses a request signature recognized by the first API type. The coexistence layer module converts the intercepted request to a format using the request signature of the second API type. The converted intercepted request is sent to the new server. The converted intercepted request is performed by the new server.

According to an embodiment of the present disclosure, a computing device for updating calls or operations in a database management system includes a processor operating a software transformation engine and a memory coupled to the processor. The memory stores instructions causing the processor to perform acts comprising mapping, by the processor, application programming interface (API) types associated with a legacy server and a new server. The legacy server recognizes request signatures of a first API type and the new server recognizes request signatures of a second API type that is distinct from the first API type. The processor receives a request from a system of engagement resident on a client-side computing device, addressed to a system of records resident on a legacy server. The request includes a call or operation. The request is intercepted by a coexistence layer module run by the processor. The processor, referencing the mapping, determines whether the intercepted request points to a system of records component that has been moved from the legacy server to a new server. A determination is made of whether the intercepted request uses a request signature recognized by the first API type. The coexistence layer module converts the intercepted request to a format using the request signature of the second API type. The converted intercepted request is sent to the new server. The converted intercepted request is performed by the new server.

The techniques described herein may be implemented in a number of ways. Example implementations are provided below with reference to the following figures.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like components or steps.

DETAILED DESCRIPTION

Figure 1:
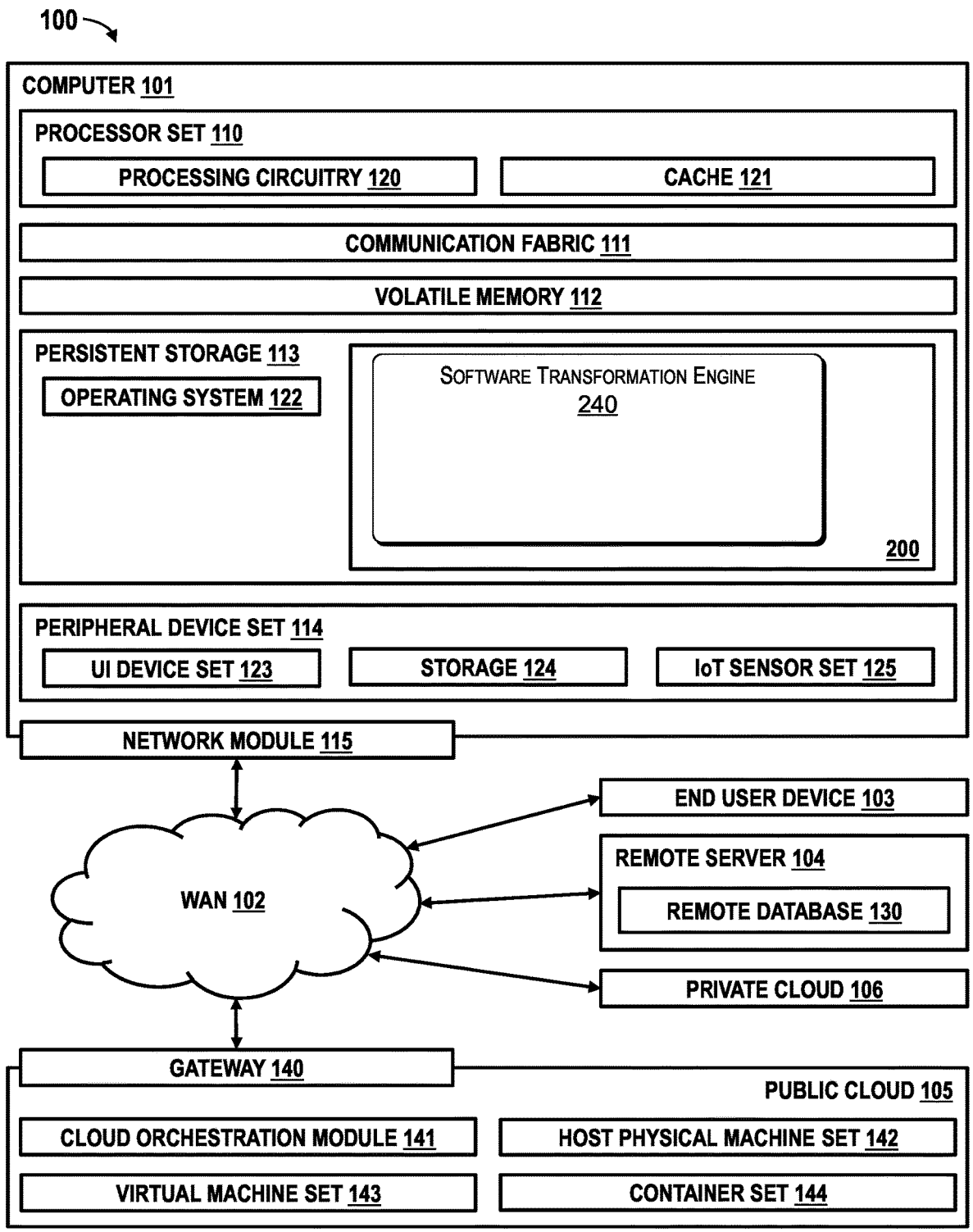
FIG. 1 is a block diagram of a computing environment for updating calls or operations in a database management system, consistent with an illustrative embodiment.

In the following detailed description, numerous specific details are set forth by way of examples in order to provide a thorough understanding of the relevant teachings. However, it should be apparent that the present teachings may be practiced without such details. In other instances, well-known methods, procedures, components, and/or circuitry have been described at a relatively high-level, without detail, in order to avoid unnecessarily obscuring aspects of the present teachings.

Definitions

Coexistence layer, as used herein, refers to a software module that bridges an interface between a system of engagement, a system of records, and a target computer server receiving components moved from the system of records.

Module, as used herein, refers to a software application, which may be standalone or may be a hardware component that includes the software application programmed in to memory or a circuit.

Target Server, as used herein, refers to a computer server receiving components of a system of records. The target server may operate under a different software protocol than the computing device holding the system of records.

Legacy Server, as used herein, refers to a computer server (or block of servers) hosting a system of records. As components from the system of records are moved to a new platform (e.g., the target server), the host server for the system of records becomes a legacy server relative to the new target server hosting the moved components.

Applications integrations module, as used herein, refers to a software module that enables individual applications, each designed for its own specific purpose, to work with one another.

Robotic Process Automation (RPA), as used herein, refers to automated software application(s) that develop an action list of tasks to be performed by watching a user or other application perform a task. Sometimes that task is observed in an application's graphical user interface (GUI). The RPA then performs automation by repeating the observed tasks.

Applications Programming Interface (API), as used herein, refers to an intermediary layer of software that processes data transfers between systems using a set of defined rules that enable different applications to communicate with each other.

Signature, as used herein, refers to the name of a software operation and the arguments contained by a function in the software operation.

Client-Side Device, as used herein, refers to a computing device accessed by a consumer or end user seeking services through a network connection from a provider.

Integrated Development Environment (IDE), as used herein, refers to a software application that facilitates other software development.

Overview

The present disclosure generally relates to database management systems. Embodiments of the subject technology provide improvements to the transformation of components in a system of records. Conventionally, to break down a system of records, some of the SoE components may be transferred to a new software platform on a target server that is distinct from the SoE and SoR. The SoE directly invokes provider components from the system of records. The system of records delivers core functionality back to the SoE. For example, when a client has a monolithic architecture for a core system of records running on a mainframe operating on COBOL, the client may decide to optimize mainframe cost and bring in a new software platform to run some of the architectural components. For example, some of the components of the mainframe architecture may be moved to a platform or server using Java® with x86 instruction compatibility. However, when breaking down a system of records into components, the caller logic used by the SoE may be incompatible with the new software platform, and may be impacted by the transformation.

In some conventional system of record architectures, a call from a client-side (or consumer) computing device running the system of engagement may result in an incompatibility when transforming provider device components running the SoR to the target server's new software platform. Generally speaking, the target server's software platform recognizes the logic calls from the provider computing device (system of records). The target server may not recognize the caller logic from the system of engagement after some of the SoR components have been moved.

Under the subject technology, a database management architecture may include a software module (referred to as a "co-existence layer") that, from the target server's perspective, appears to be the provider's computing device. In an embodiment, robotic process automation (RPA) is included in the co-existence layer to generate adapters. When a call is made between the client-side computing device and the target server, the co-existence layer makes a determination of whether the caller logic may need to be converted so that the target server can read the caller logic from the SoE. When a call is to be converted, an adapter converts the call logic for comprehension by the target server.

As will be appreciated, while many of the elements in the subject technology are software-based, the processes involved provide an improvement to computing technology; namely by making calls between the consumer computing device and target server compatible for system of records applications. It should be further appreciated that aspects of the teachings herein are beyond the capability of a human mind since the communication is between machine elements (system of engagement, system of record, and target server). It should also be appreciated that the various embodiments of the subject disclosure described herein can include information that is impossible to obtain manually by an entity, such as a human user.

Example Computing Environment

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one or more storage devices that may include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 includes an example of an environment for the execution of at least some of the computer code involved in performing the inventive methods, such as the improved SoR transformation code 200. The improved SoR transformation code 200 may include a software transformation engine 240 that generates a coexistence layer and adapters for making calls or actions compatible between a system of engagement client device and a target server's software platform. The software transformation engine 240 may operate according to one or more of the methods disclosed in further detail below. In addition to SoR transformation code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and SoR transformation code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. For the instant disclosure, the processor set 110 includes for example a central processing unit (CPU) and an accelerator. In some embodiments, a different type of processing element may be used instead of the CPU, (for example, a GPU or other process dedicated/specialized unit). Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in SoR transformation code 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in SoR transformation code 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Example System Architecture

Figure 2:
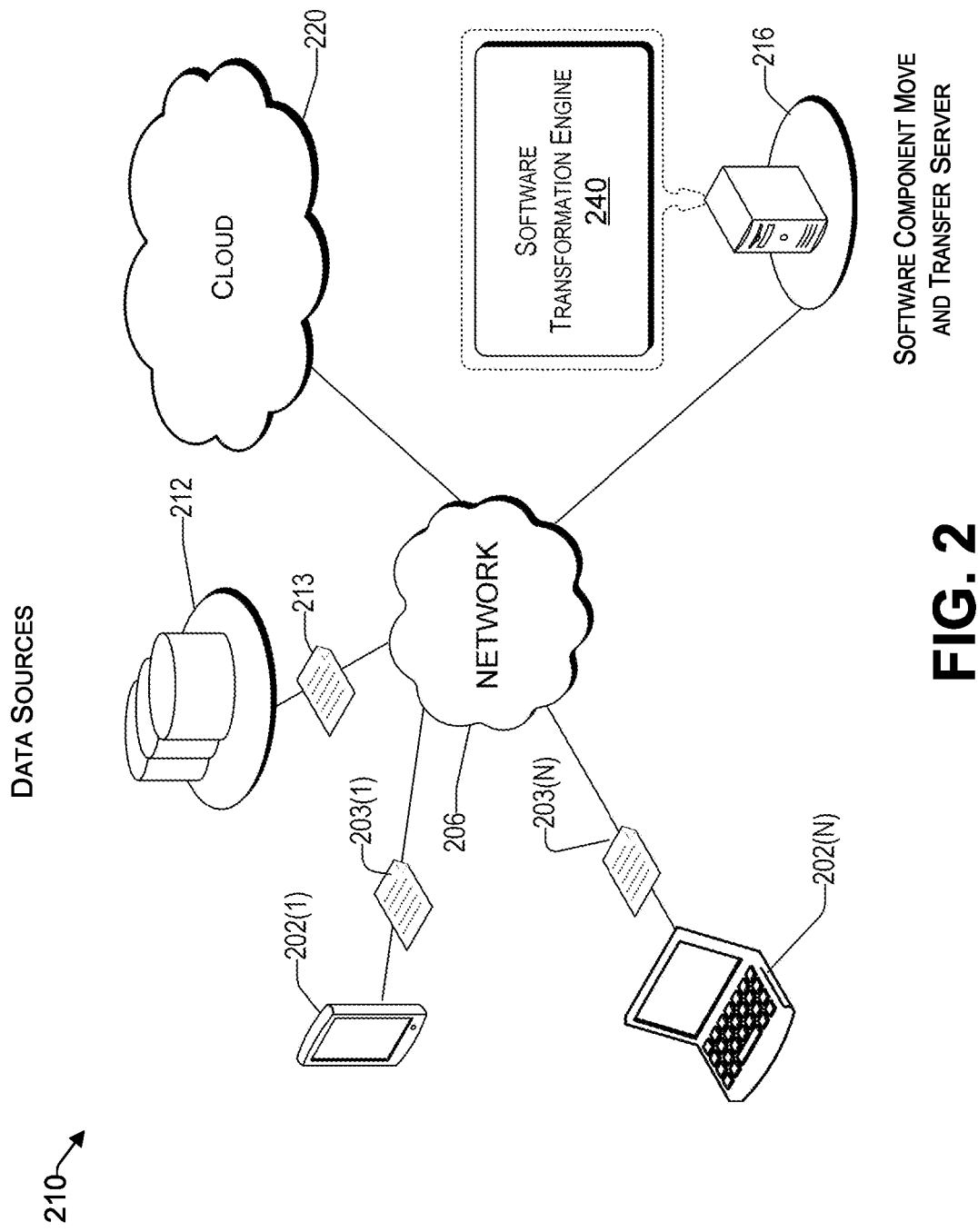
FIG. 2 is a block diagram of an architecture for updating calls or operations in a database management system, consistent with an illustrative embodiment.

FIG. 2 illustrates an example architecture 210 for automatic generation of a coexistence layer using robotic process automation in database management systems. Architecture 210 includes a network 206 that allows various computing devices 202(1) to 202(N) to communicate with each other, as well as other elements that are connected to the network 206, such as data source 212, a software component move and transform server 216, and the cloud 220. The computing devices 202(1) to 202(N) and software component move and transform server 216 may operate under the computing environment described above in FIG. 1. The software component move and transform server 216 may operate the SoR transformation code 200, including the module for the software transformation engine 240. The software transformation engine 240 may be configured to generate a coexistence layer that provides adapters for some caller or operation logic in the software component move and transform server 216 that convert the caller or operation logic into a format or protocol that is understood by a target server receiving components moved from a system of records.

The network 206 may be, without limitation, a local area network ("LAN"), a virtual private network ("VPN"), a cellular network, the Internet, or a combination thereof. For example, the network 206 may include a mobile network that is communicatively coupled to a private network, sometimes referred to as an intranet that provides various ancillary services, such as communication with various application stores, libraries, and the Internet. The network 206 allows the software transformation engine 240, which is a software program running on software component move and transform server 216, to communicate with the data source 212, computing devices 202(1) to 202(N), and/or the cloud 220, to provide data processing. The data source 212 may include source data being processed for operations to be used in processing the source data, that will be processed under one or more techniques described here. In some embodiments, the data source 212 may include legacy server software protocols and signatures for calls and operations, and target server protocols and signatures for calls and operations. In some embodiments, a data packet 213 may be received by the software transformation engine 240. This data packet 213 can be received by the software transformation engine 240 by either a push operation from the data source 212 or from a pull operation of the software transformation engine 240. In one embodiment, the data processing is performed at least in part on the cloud 220.

For purposes of later discussion, several user devices appear in the drawing, to represent some examples of the computing devices that may be the source of data being analyzed depending on the task chosen. Aspects of the symbolic sequence data (e.g., 203(1) and 203(N)) may be communicated over the network 206 with the software transformation engine 240 of the software component move and transform server 216. Today, user devices typically take the form of portable handsets, smart-phones, tablet computers, personal digital assistants (PDAs), and smart watches, although they may be implemented in other form factors, including consumer, and business electronic devices. While the data source 212 and the software transformation engine 240 are illustrated by way of example to be on different platforms, it will be understood that in various embodiments, the data source 212 and the software component move and transform server 216 may be combined. In other embodiments, these computing platforms may be implemented by virtual computing devices in the form of virtual machines or software containers that are hosted in a cloud 220, thereby providing an elastic architecture for processing and storage.

Example System of Transformation

Figure 3:
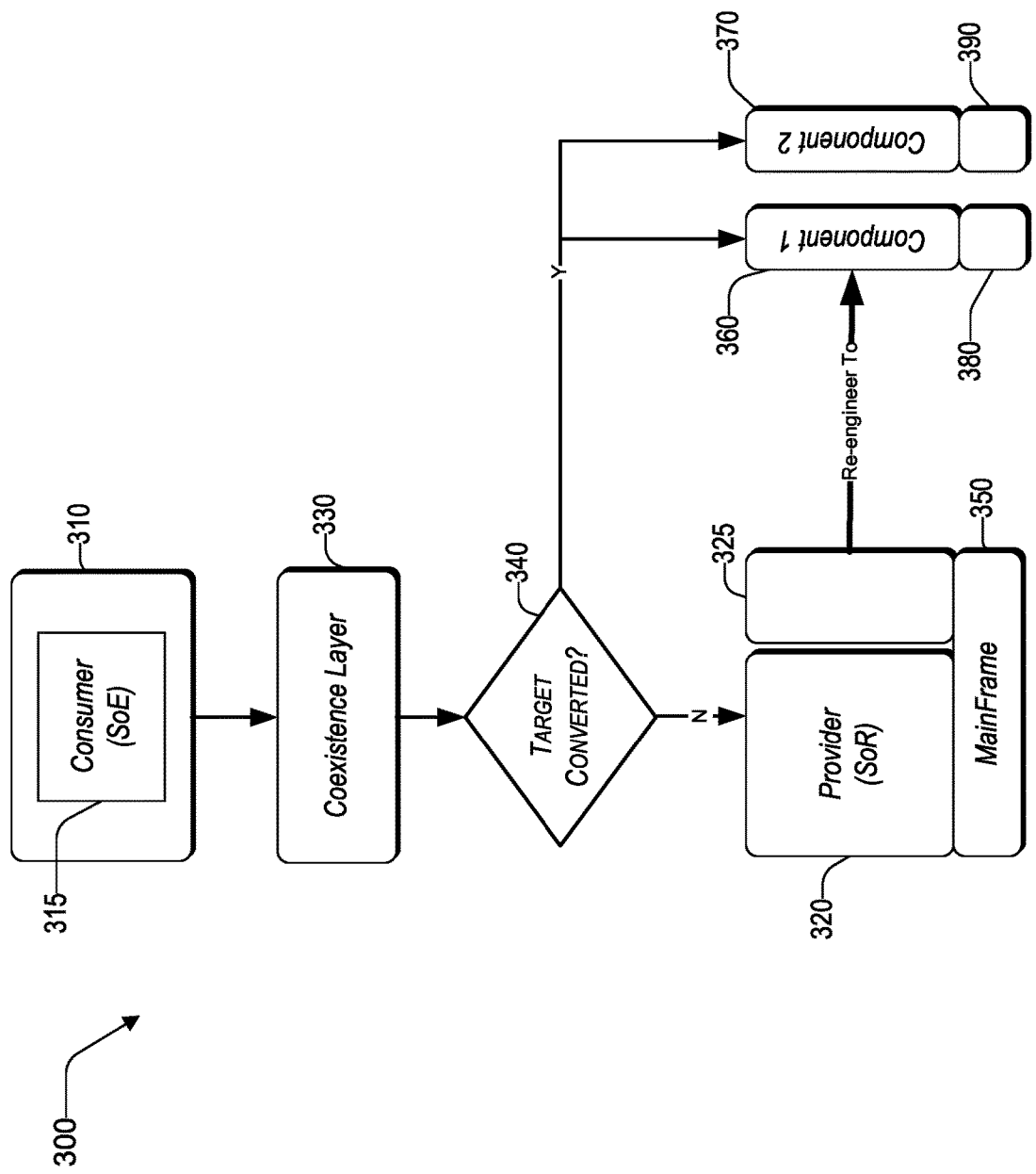
FIG. 3 is a block diagram of an information storage system, consistent with an illustrative embodiment.

FIG. 3 shows a system 300 for transforming caller logic in a database management system according to an environment. A client-side computing device 310 may include a resident system of engagement (SoE) module 315. Embodiments of the subject technology will include a coexistence layer module 330 that interfaces with the system of engagement module 315, a system of records module 320 that may be resident on a legacy mainframe or other computer server 350, and target server(s) 380 and 390. The coexistence layer module 330 may be resident as a software application on a computing device (such as the server 216 of FIG. 2) that is in network communication with the client-side computing device 310, the legacy mainframe or other computer server 350, and the target servers 380 and 390.

The target servers 380 and 390 may run on one or more software protocol platforms that are different than or distinct from the software protocol used by the mainframe 350 to operate the system of records module 320. The coexistence layer module 330 may comprise a robotic process automation (RPA) that detects when a call or operation request from the SoE module 315 may involve conversion to the software protocol used by the target servers 380 or 390. When components from the system of records module 320 are moved from the architecture 325 to a new software platform on either the target server 380 or 390, a transformation process may convert the moved components into transformed components 360 and/or 370.

For example, if a call or operation request invokes a component moved from the system of records module 320 to one of the target servers 380 or 390 in block 340, the call or operation request may be routed through the coexistence layer module 330 where the RPA adapts the call or operation request to use the software protocol of the target server 380 or 390. Otherwise, if the component invoked remains on the legacy mainframe or other computer server 350 housing the system of records module 320, the call or operation request may be routed to the component in the system of records module 320.

Example Architecture and Methodology

Figure 4:
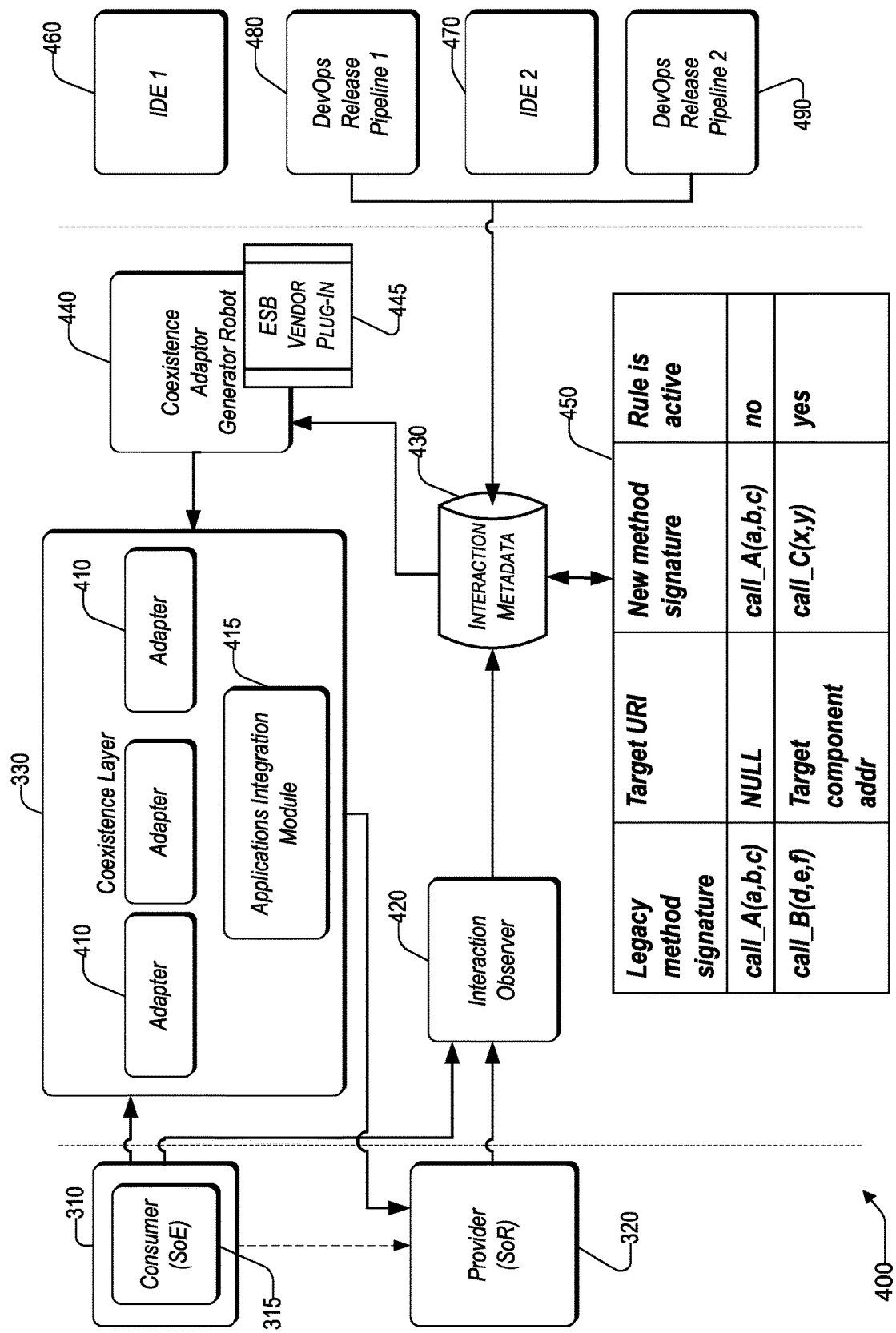
FIG. 4 is a block diagram of an architecture for updating calls or operations in a database management system, consistent with an illustrative embodiment.

FIG. 4 shows an architecture 400 for updating calls or operations in a database management system according to an embodiment. The architecture 400 shows the coexistence layer module 330 with cooperating elements between the SoE module 315, SoR 320, and integrated development environments (IDEs) 460 and 470, in additional detail. In general, a computer processor, (for example, the processor set 110 in FIG. 1), controls the operations of the coexistence layer module 330.

The coexistence layer module 330 may include one or more adapter software modules 410 that adapt call or operation logic from the SoE module 315 to the new software logic protocol used in a new target server platform. The coexistence layer module 330 may include an applications integrations module 415 (for example, an enterprise service bus (ESB) or Java® runtime module) that enables different applications running in the SoE module 315 to operate with the SoR module 320.

Figure 5:
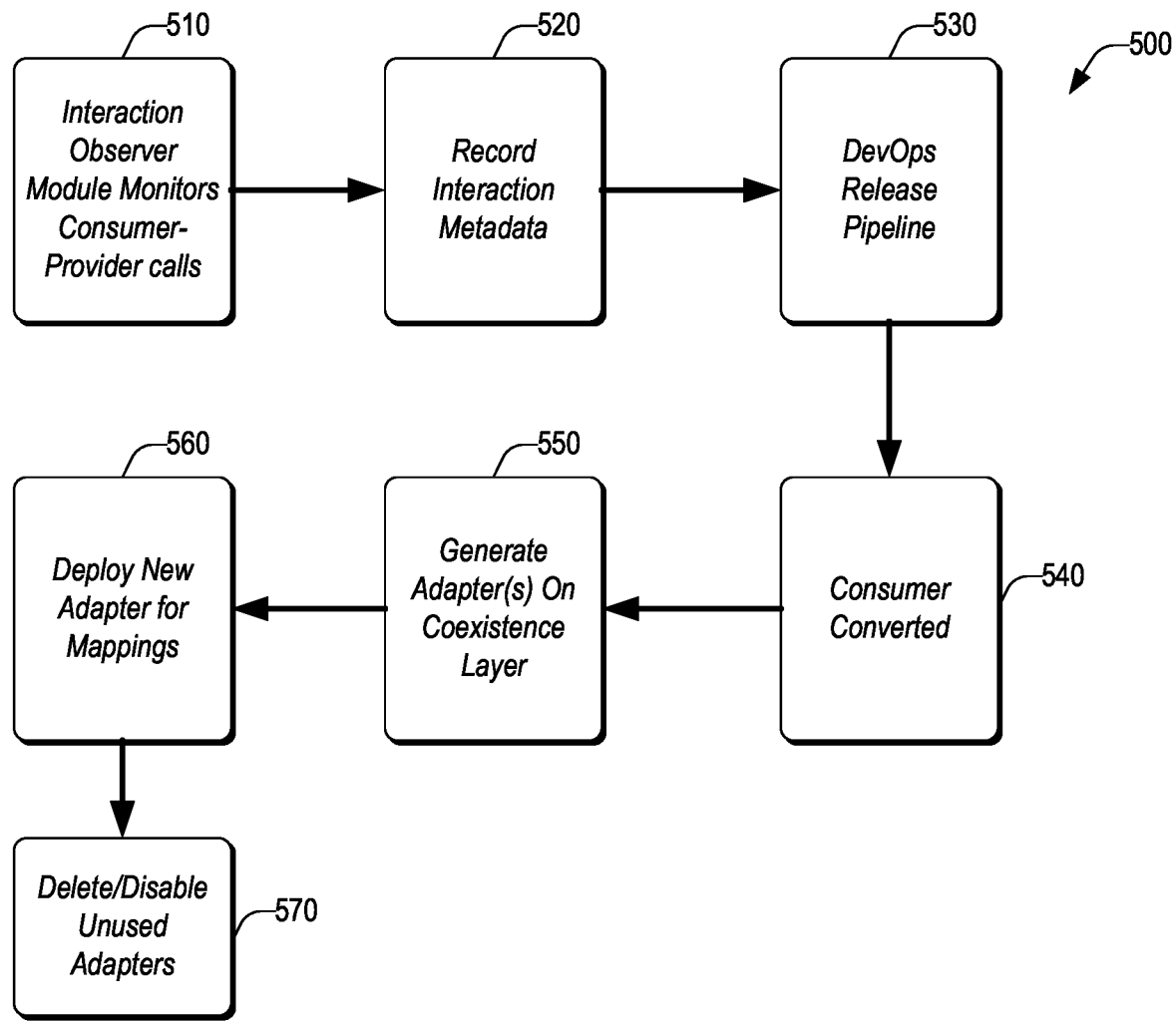
FIG. 5 is a flowchart of a method for updating calls or operations in a database management system, according to an embodiment.

An example operation of the architecture 400 may be seen with concurrent reference to FIG. 5, which shows a method 500 of updating calls or operations from a legacy system to a new software platform in a database management system. Operations in the method 500 will be referenced by block number in parentheses in the following continued description of architecture 400.

The architecture 400 may include an interaction observer software module 420 that may be configured to monitor requests (calls or operations) between the SoE module 315 and the SoR module 320 (block 510). A single request may include multiple calls or operations. The observer software module 420 may record the interactions between the SoE module 315 and the SoR module 320 as interaction metadata 430 that may be mapped for future reference (block 520). For example, stored metadata (examples of which are shown in table 450), may include whether a call (or operation) uses a legacy method signature (using for example, an API of a first type recognized by the legacy server) or a new method signature (using for example, an API of a second type used by a target server with moved/transformed components). Other metadata may include whether a call (or operation) uses a uniform resource identifier associated with a new target server and the target component's address. The previously described mapping may be referenced to determine whether requests are addressed to the legacy server or to a new target server. For calls/operations that are addressed to a new target server, the observer software module 420 may record whether a rule for converting the call or operation request to the new target server API protocol is active and tracks the legacy signature method in association with the converted, new signature method of the call or operation.

Development and operations ("DevOps") release pipelines 480 and 490 may write the new translation/mapping rules in the interaction metadata 430. The development and operations release pipelines 480 and 490 may determine when to activate (release) new translation/mapping rules (block 530). The release pipeline may be used to 'release' a new, modernized component extracted from the SoR. The pipeline does the actual release for the biggest part of its job. Then, the release pipeline may include, as a final step, the logic that marks in respective tuples in the metadata table, an instruction that the call has moving forward, a new target (instead of the legacy server), alongside the URI including the new signature. The tuple may be created initially by the observer software module 420 and may be subsequently updated by the release pipeline when a new target component is released into production. If a part of the system of engagement module 315 is converted into a new component that is released (block 540), the observer software module 420 records the uniform resource identifier and new method signature in interaction metadata 430.

The architecture 400 may include a robotic process automation (RPA) module 440 that takes the input from interaction metadata 430 and converts the input into generated adapter software modules 410 in the coexistence layer module 330 (block 550). The robotic process automation may automatically generate an adapter software module 410 upon determining that the call or operation request from the system of engagement module 315 is addressed to the system of records module component 360 or 370 moved to the new target server 380 or 390. The adapter software module 410 maps the legacy method signature to the new, transformed call (or operation request) API signature. For each new mapping, a new adapter software module 410 may be deployed by the RPA module 440 to the applications integrations module 415 using either API calls or UI actions (block 560). The API calls or UI actions used may depend on the applications integration provider, using an applications integrations plugin 445 (for example, an ESB plug-in). Adapter software module 410 may be generated and built using specific applications integration technology integrated development environments 460 or 470. In some embodiments, the RPA module 440 may delete adapter software modules 410 that are inactive (which may be recorded as deleted or disabled in the interaction metadata 430 storage) (block 570).

Figure 6:
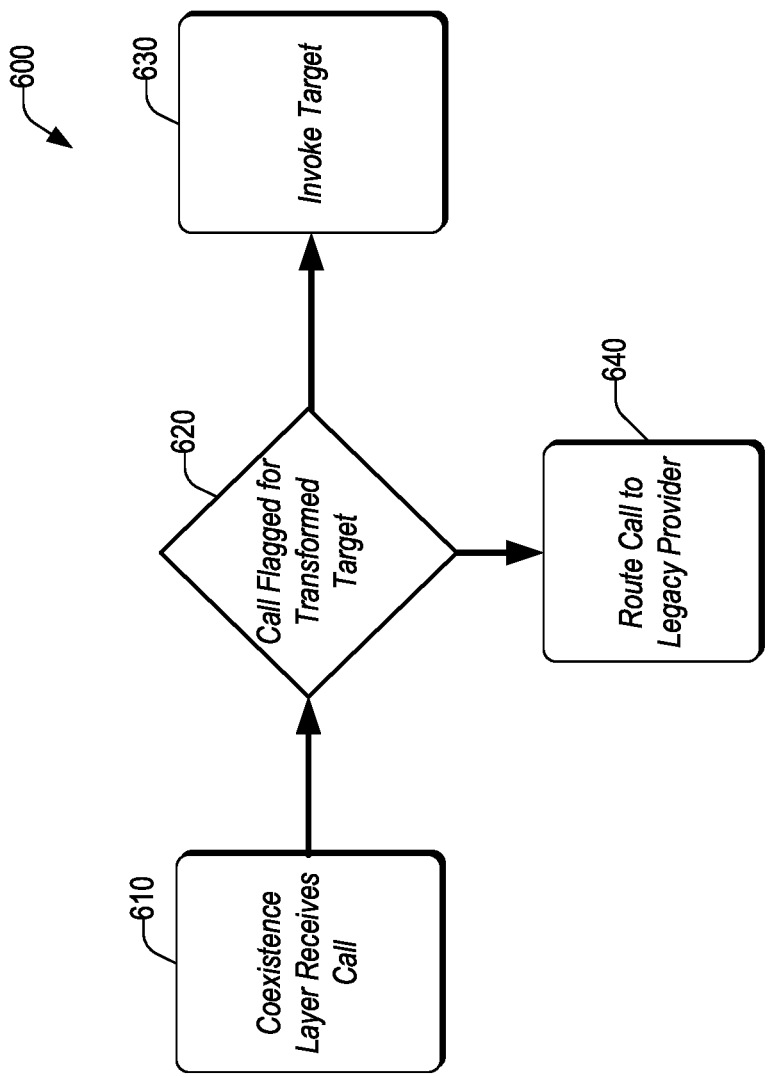
FIG. 6 is a flowchart of a method for routing calls or operations through a coexistence layer, according to an embodiment.

FIG. 6 shows a method of operation in the coexistence layer module 330 according to an embodiment. An invocation of the coexistence layer module 330 starts when the coexistence layer module 330 receives a call or operation request from the system of engagement client-side device addressed to the system of records in the provider computing device (block 610). Instead of the call being sent directly to the provider computing device, the call may be intercepted by the coexistence layer module 330 (which may be resident on the move and transform server 216 of FIG. 2). The coexistence layer module 330 provides the same method signature as the original method from the system of records module 320.

In block 620, the coexistence layer module 330 may check the interaction metadata 430 repository to determine whether the intercepted call or operation request is flagged to point to a transformed component in a target server (for example, a system of records component that has been moved from the legacy server to a new server). If flagged, the targeted server is invoked instead of the legacy provider server (mainframe 350) in block 630. The coexistence layer module may convert the intercepted call or operation request to the software protocol used by the target server. The converted intercepted call or operation request is sent to the target server where the call or operation request is performed. Otherwise, the coexistence layer module 330 will route the call to the legacy provider server (mainframe 350) in a pass-through action, in block 640.

CONCLUSION

The descriptions of the various embodiments of the present teachings have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

While the foregoing has described what are considered to be the best state and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

The components, steps, features, objects, benefits and advantages that have been discussed herein are merely illustrative. None of them, nor the discussions relating to them, are intended to limit the scope of protection. While various advantages have been discussed herein, it will be understood that not all embodiments necessarily include all advantages. Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

Numerous other embodiments are also contemplated. These include embodiments that have fewer, additional, and/or different components, steps, features, objects, benefits and advantages. These also include embodiments in which the components and/or steps are arranged and/or ordered differently.

Aspects of the present disclosure are described herein with reference to call flow illustrations and/or block diagrams of a method, apparatus (systems), and computer program products according to embodiments of the present disclosure. It will be understood that each step of the flowchart illustrations and/or block diagrams, and combinations of blocks in the call flow illustrations and/or block diagrams, can be implemented by computer readable program instructions.

These computer readable program instructions may be provided to a processor of a computer, special purpose computer, or other programmable data processing apparatus to produce a machine, such that the instructions, which execute via the processor of the computer or other programmable data processing apparatus, create means for implementing the functions/acts specified in the call flow process and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the call flow and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the call flow process and/or block diagram block or blocks.

The flowchart and block diagrams in the Figures illustrate the architecture, functionality, and operation of possible implementations of systems, methods, and computer program products according to various embodiments of the present disclosure. In this regard, each block in the call flow process or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or call flow illustration, and combinations of blocks in the block diagrams and/or call flow illustration, can be implemented by special purpose hardware-based systems that perform the specified functions or acts or carry out combinations of special purpose hardware and computer instructions.

While the foregoing has been described in conjunction with exemplary embodiments, it is understood that the term "exemplary" is merely meant as an example, rather than the best or optimal. Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments have more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A computer program product for updating calls or operations in a database management system, the computer program product comprising:
    one or more computer readable storage media, and program instructions collectively stored on the one or more computer readable storage media, the program instructions comprising:
    mapping, by a computer processor, application programming interface (API) types associated with a legacy server and a new server, wherein the legacy server recognizes a first plurality of request signatures of a first API type of the API types and the new server recognizes a second plurality of request signatures of a second API type of the API types, and wherein the second API type is different from the first API type;
    receiving, by the computer processor, a request from a system of engagement resident on a client-side computing device, addressed to a system of records resident on the legacy server, wherein the request includes a call or operation of the calls or operations;
    intercepting the request by a coexistence layer module run by the computer processor;
    determining, by the computer processor referencing the mapping, whether the intercepted request points to a component, of the system of records, that has been moved from the legacy server to the new server;
    determining whether the intercepted request uses a request signature of the first plurality of request signatures of the first API type;
    converting, by the coexistence layer module, based on the determining that the intercepted request points to the component that has been moved from the legacy server to the new server, the intercepted request to a format using a request signature of the second plurality of request signatures of the second API type;
    sending the converted intercepted request to the new server; and
    performing the converted intercepted request by the new server.

2. The computer program product of claim 1, wherein the program instructions further comprise operating an applications integrations module in the coexistence layer module, wherein
    the applications integrations module enables different applications running in the system of engagement to operate with the system of records.

3. The computer program product of claim 2, wherein the program instructions further comprise:
    operating a robotic process automation in the coexistence layer module;
    automatically generating an adapter software module by the robotic process automation upon determining that the intercepted request from the system of engagement is addressed to the component, of the system of records, that has been moved to the new server; and
    mapping, by the adapter software module, the intercepted request to an address on the new server.

4. The computer program product of claim 3, wherein the program instructions further comprise, for new mappings, generating a new adapter software module deployed by the robotic process automation to the applications integrations module using one of application programming interface calls or user interface actions.

5. The computer program product of claim 4, wherein the program instructions further comprise deleting, by the robotic process automation, the adapter software module that is inactive.

6. The computer program product of claim 1, wherein the program instructions further comprise:
    monitoring new requests between the system of engagement and the system of records, by an interaction observer software module;
    recording, by the interaction observer software module, the new requests between the system of engagement and the system of records as interaction metadata; and
    referencing, by the coexistence layer module, the interaction metadata in the converting of the intercepted request to a second software protocol.

7. The computer program product of claim 1, wherein the program instructions further comprise:
    determining, by the computer processor, whether the intercepted request points to a component, of the system of records, that remains resident on the legacy server; and
    sending the intercepted request through to the legacy server.

8. A computer-implemented method for updating calls or operations in a database management system, the computer-implemented method comprising:
    mapping, by a computer processor, application programming interface (API) types associated with a legacy server and a new server, wherein the legacy server recognizes a first plurality of request signatures of a first API type of the API types and the new server recognizes a second plurality of request signatures of a second API type of the API types, and wherein the second API type is different from the first API type;

receiving, by the computer processor, a request from a system of engagement resident on a client-side computing device, addressed to a system of records resident on the legacy server, wherein the request includes a call or operation of the calls or operations;

intercepting the request by a coexistence layer module run by the computer processor;

determining, by the computer processor referencing the mapping, whether the intercepted request points to a component, of the system of records, that has been moved from the legacy server to the new server;

determining whether the intercepted request uses a request signature of the first plurality of request signatures of the first API type;

converting, by the coexistence layer module, based on the determining that the intercepted request points to the component that has been moved from the legacy server to the new server, the intercepted request to a format using a request signature of the second plurality of request signatures of the second API type;

sending the converted intercepted request to the new server; and performing the converted intercepted request by the new server.

9. The computer-implemented method of claim 8, further comprising operating an applications integrations module in the coexistence layer module, wherein the applications integrations module enables different applications running in the system of engagement to operate with the system of records.

10. The computer-implemented method of claim 9, further comprising:

operating a robotic process automation in the coexistence layer module;

automatically generating an adapter software module by the robotic process automation upon determining that the intercepted request from the system of engagement is addressed to the component, of the system of records, that has been moved to the new server; and mapping, by the adapter software module, the intercepted request to an address on the new server.

11. The computer-implemented method of claim 10, further comprising, for new mappings, generating a new adapter software module deployed by the robotic process automation to the applications integrations module using one of application programming interface calls or user interface actions.

12. The computer-implemented method of claim 11, further comprising deleting, by the robotic process automation, the adapter software module that is inactive.

13. The computer-implemented method of claim 8, further comprising:

monitoring new requests between the system of engagement and the system of records, by an interaction observer software module;

recording, by the interaction observer software module, the new requests between the system of engagement and the system of records as interaction metadata; and referencing, by the coexistence layer module, the recorded interaction metadata in the converting of the intercepted request to a second software protocol.

14. The computer-implemented method of claim 8, further comprising:

determining, by the computer processor, whether the intercepted request points to a component, of the system of records, that remains resident on the legacy server; and sending the intercepted request through to the legacy server.

15. A computing device configured to update calls or operations in a database management system, the computing device comprising:

a processor operating a software transformation engine; and a memory coupled to the processor, the memory storing instructions to cause the processor to perform operations comprising:

mapping, by the processor, application programming interface (API) types associated with a legacy server and a new server, wherein the legacy server recognizes a first plurality of request signatures of a first API type of the API types and the new server recognizes a second plurality of request signatures of a second API type of the API types, and wherein the second API type is different that is distinct from the first API type;

receiving, by the processor, a request from a system of engagement resident on a client-side computing device, addressed to a system of records resident on the legacy server, wherein the request includes a call or operation of the calls or operations;

intercepting the request by a coexistence layer module run by the processor;

determining, by the processor referencing the mapping, whether the intercepted request points to a component, of the system of records, that has been moved from the legacy server to the new server;

determining whether the intercepted request uses a request signature of the first plurality of request signatures of the first API type;

converting, by the coexistence layer module, based on the determining that the intercepted request points to the component that has been moved from the legacy server to the new server, the intercepted request to a format using a request signature of the second plurality of request signatures of the second API type;

sending the converted intercepted request to the new server; and performing the converted intercepted request by the new server.

16. The computing device of claim 15, wherein the instructions cause the processor to perform the operations further comprising operating an applications integrations module in the coexistence layer module, wherein the applications integrations module enables different applications running in the system of engagement to operate with the system of records.

17. The computing device of claim 16, wherein the instructions cause the processor to perform the operations further comprising:

operating a robotic process automation in the coexistence layer module;

automatically generating an adapter software module by the robotic process automation upon determining that the intercepted request from the system of engagement is addressed to the component, of the system of records, that has been moved to the new server; and mapping, by the adapter software module, the intercepted request to an address on the new server.

18. The computing device of claim 17, wherein the instructions cause the processor to perform the operations further comprising, for new mappings, generating a new adapter software module deployed by the robotic process automation to the applications integrations module using one of application programming interface calls or user interface actions.

19. The computing device of claim 15, wherein the instructions cause the processor to perform the operations further comprising:
  monitoring new requests between the system of engagement and the system of records, by an interaction observer software module;
  recording, by the interaction observer software module, the new requests between the system of engagement and the system of records as interaction metadata; and
  referencing, by the coexistence layer module, the interaction metadata in the converting of the intercepted request to a second software protocol.

20. The computing device of claim 17, wherein the instructions cause the processor to perform the operations further comprising:
  determining, by the processor, whether the intercepted request points to a component, of the system of records, that remains resident on the legacy server; and
  sending the intercepted request through to the legacy server.

* * * * *